United States Patent
Tanaka et al.

(10) Patent No.: US 7,926,846 B2
(45) Date of Patent: Apr. 19, 2011

(54) SUSPENSION SUBFRAME STRUCTURE OF VEHICLE

(75) Inventors: Masaaki Tanaka, Hiroshima (JP);
Katsuyuki Komiya, Hatsukaichi (JP);
Shin Murata, Hiroshima (JP)

(73) Assignee: Mazda Motor Corporation (JP)

( * ) Notice: Subject to any disclaimer, the term of this patent is extended or adjusted under 35 U.S.C. 154(b) by 53 days.

(21) Appl. No.: 12/396,026

(22) Filed: Mar. 2, 2009

(65) Prior Publication Data

US 2009/0243271 A1 Oct. 1, 2009

(30) Foreign Application Priority Data

Mar. 26, 2008 (JP) ................ 2008-081192

(51) Int. Cl.
*B62D 21/11* (2006.01)
(52) U.S. Cl. ..................................... 280/781
(58) Field of Classification Search ........... 280/124.109, 280/124.135, 124.143, 781, 788
See application file for complete search history.

(56) References Cited

U.S. PATENT DOCUMENTS

| | | | | |
|---|---|---|---|---|
| 4,453,740 A * | 6/1984 | von der Ohe et al. | ......... | 280/781 |
| 4,491,341 A * | 1/1985 | Maebayashi | ........... | 280/124.128 |
| 4,671,531 A * | 6/1987 | Sautter et al. | .......... | 280/124.128 |
| 5,560,638 A * | 10/1996 | Lee | ........................ | 280/124.143 |
| 6,338,495 B1 * | 1/2002 | Lee et al. | ............... | 280/124.143 |
| 6,357,772 B1 * | 3/2002 | Pelz et al. | ............ | 280/124.143 |
| 6,739,624 B2 * | 5/2004 | Barber et al. | .................. | 280/781 |
| 6,938,908 B2 * | 9/2005 | Oda et al. | ............... | 280/124.109 |
| 6,979,023 B2 * | 12/2005 | Mikasa et al. | .......... | 280/124.109 |
| 2005/0140110 A1 * | 6/2005 | Lee et al. | ............... | 280/124.109 |

FOREIGN PATENT DOCUMENTS

JP 2005-193893 A 7/2005

* cited by examiner

*Primary Examiner* — Paul N Dickson
*Assistant Examiner* — Robert A Coker
(74) *Attorney, Agent, or Firm* — Studebaker & Brackett PC; Donald R. Studebaker

(57) ABSTRACT

A structure of a suspension subframe (1) for supporting a plurality of suspension arms (12, 14, 16) of multi-link suspension systems (2), which comprises first and second lateral members (20, 22) each extending in a lateral direction of a vehicle body, a pair of longitudinal members (24, 26) each extending in a longitudinal direction of the vehicle body, a pair of right and left upper-arm support portions (52) provided in right and left ends of the first lateral member (20 or 22), respectively, and a pair of right and left lower-arm support portions (50) provided in the right and left ends of the first lateral member (20 or 22), respectively, wherein the first lateral member (20 or 22) is formed to allow a load to be transmitted diagonally between the left upper-arm support portion (52) and the right lower-arm support portion (50) and diagonally between the left lower-arm support portion (50) and the right upper-arm support portion (52).

22 Claims, 11 Drawing Sheets

SUSPENSION SUBFRAME STRUCTURE OF VEHICLE

BACKGROUND OF THE INVENTION

1. Field of the Invention

The present invention relates to a suspension subframe structure of a vehicle, and more particularly to a suspension subframe structure of a vehicle for supporting a plurality of suspension arms of a multi-link suspension system.

2. Description of the Related Art

Heretofore, a multi-link suspension system called "E-type multi-link suspension system" has been known. JP 2005-193893A (hereinafter referred to as "Patent Document 1") discloses a structure of a rear suspension subframe for supporting a plurality of suspension arms of an E-type multi-link rear suspension systems.

A conventional subframe, such as the subframe disclosed in the Patent Document 1, comprises a plurality of subframe members each having a rectangular-shaped hollow closed cross-section or an angular C-shaped cross-section, wherein the plurality of subframe members are assembled together in a double cross shape. In the conventional subframe, in order to handle or receive a large input load (such as tensile and compressive loads) from in the suspension arms, particularly, during turning of a vehicle, it is necessary to increase its rigidity by enlarging a cross-sectional area of the subframe member itself or providing a reinforcing member, which leads to a problem about an increase in weight.

Moreover, depending on mounting positions of the suspension arms to the subframe member extending in a frontward-rearward (i.e., longitudinal) direction of the vehicle and the subframe member extending in a widthwise (i.e., lateral) direction of the vehicle, torsional or bending deformation occurs between the subframe members. This is disadvantageous in terms of rigidity and reliability, to cause a further increase in weight.

SUMMARY OF THE INVENTION

In view of the above problems in the conventional subframe, it is an object of the present invention to provide a suspension subframe structure of a vehicle, capable of improving rigidity of a suspension subframe to effectively receive an input load from suspension arms, while reducing a weight of the suspension subframe.

In order to achieve this object, according to one aspect of the present invention, there is provided a suspension subframe structure of a vehicle for supporting a plurality of suspension arms of a multi-link suspension system. The suspension subframe structure comprises: first and second lateral members provided in spaced-apart relation to each other in a longitudinal direction of a vehicle body and each extending in a lateral direction of the vehicle body; a pair of longitudinal members extending in the longitudinal direction in such a manner that one of the longitudinal member connects respective left ends of the first and second lateral members, and the other longitudinal member connects respective right ends of the first and second lateral members; a pair of right and left upper-arm support portions provided in respective ones of the right and left ends of the first lateral member; and a pair of right and left lower-arm support portions provided in respective ones of the right and left ends of the first lateral member, wherein the first lateral member is formed to allow a load to be transmitted diagonally between the left upper-arm support portion and the right lower-arm support portion and diagonally between the left lower-arm support portion and the right upper-arm support portion.

In the suspension subframe structure of the present invention, the right and left upper-arm support portions are provided in respective ones of the right and left ends of the first lateral member, and the right and left lower-arm support portions are provided in respective ones of the right and left ends of the first lateral member. During turning of the vehicle, for example, during clockwise turning on an assumption that right and left wheels have the same phase at a tire/ground contact point, a load compressing the first lateral member is applied to a left lower arm and to a right upper arm diagonally aligned with the left lower arm, and a load tensioning the first lateral member is applied to a left upper arm and to a right lower arm diagonally aligned with the left upper arm. All the loads are lateral loads. In the present invention, as measures against such loads, the first lateral member is formed to allow a load to be transmitted diagonally between the left upper-arm support portion and the right lower-arm support portion and diagonally between the left lower-arm support portion and the right upper-arm support portion. Thus, the first lateral member can effectively support the above suspension arms to cancel out the above large input loads from right and left sides during the turning of the vehicle. This makes it possible to improve rigidity of the suspension subframe to effectively receive a load from the suspension arms, while reducing a weight of the suspension subframe.

These and other objects, features and advantages of the present invention will become more apparent upon reading the following detailed description along with the accompanying drawings.

DETAILED DESCRIPTION OF PREFERRED EMBODIMENT OF THE INVENTION

With reference to the drawings, the present invention will now be described based on a preferred embodiment thereof.

Figure 1:
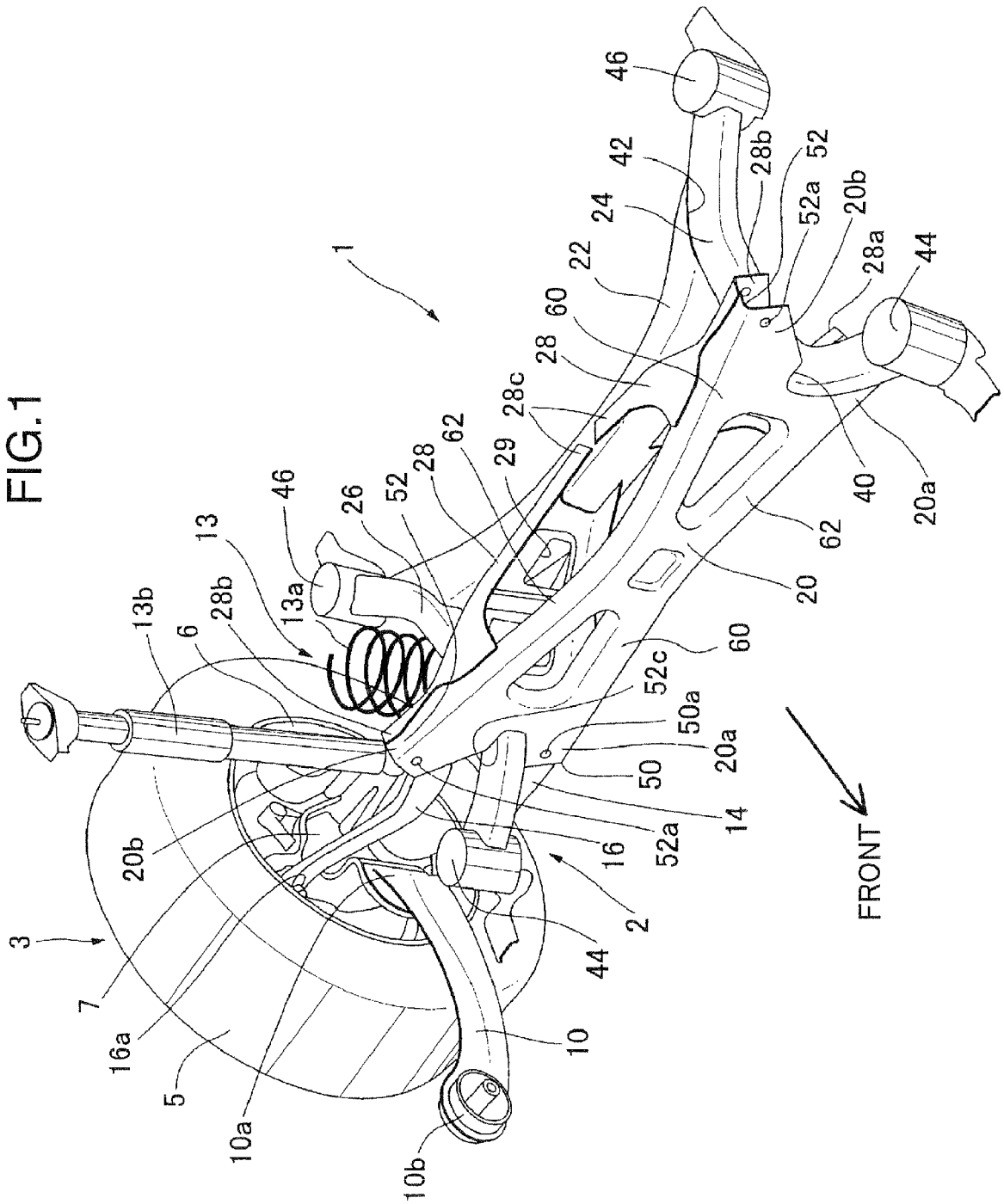
FIG. 1 is a perspective view showing a rear underbody structure of a vehicle with a suspension subframe structure according to one embodiment of the present invention, when viewed from a front and left side thereof and obliquely from thereabove.
Figure 2:
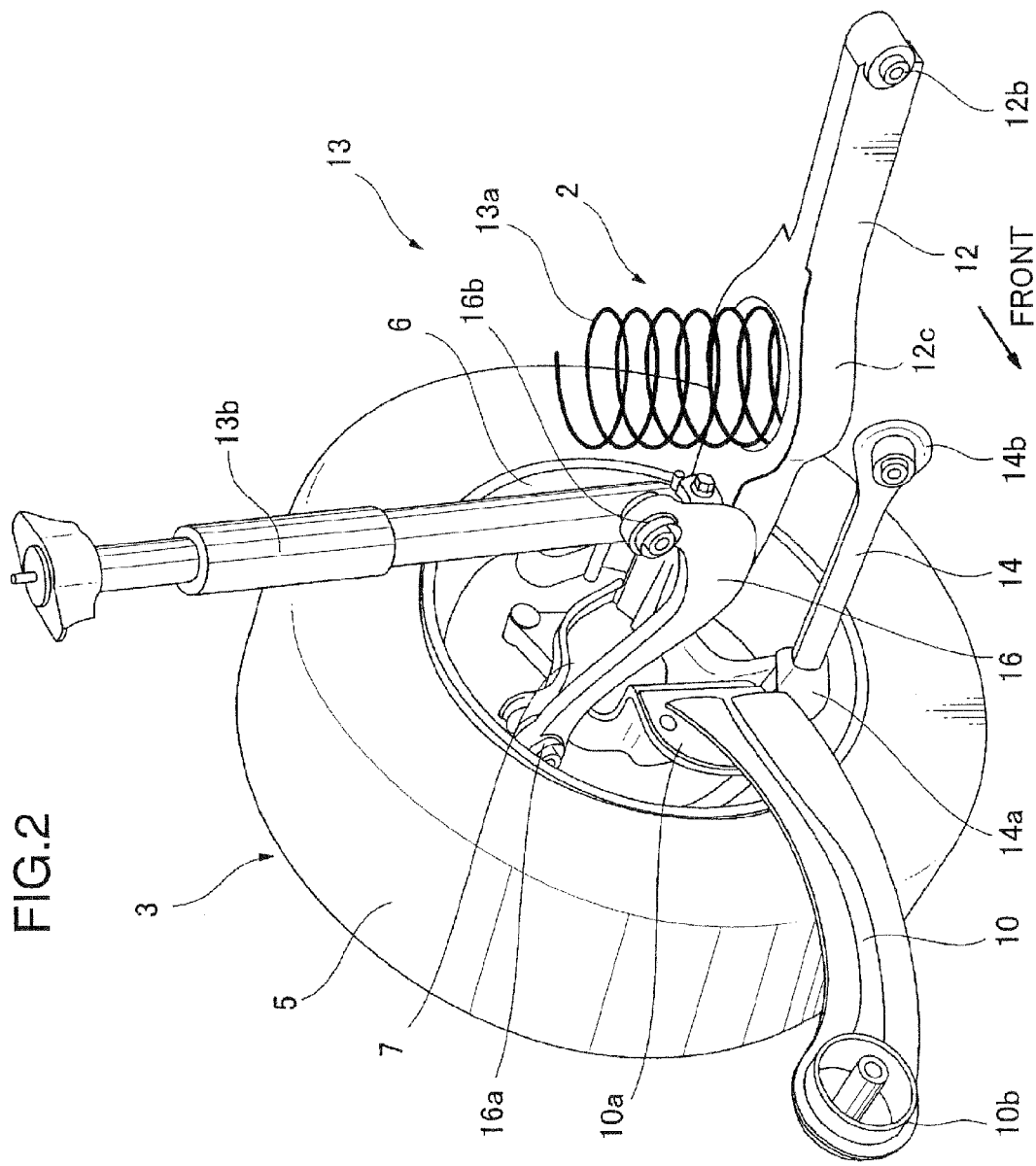
FIG. 2 is a perspective view showing a right rear suspension system and a right rear wheel assembly mounted to the suspension subframe structure according to the embodiment, when viewed from a front and left side thereof and obliquely from thereabove.
Figure 3:
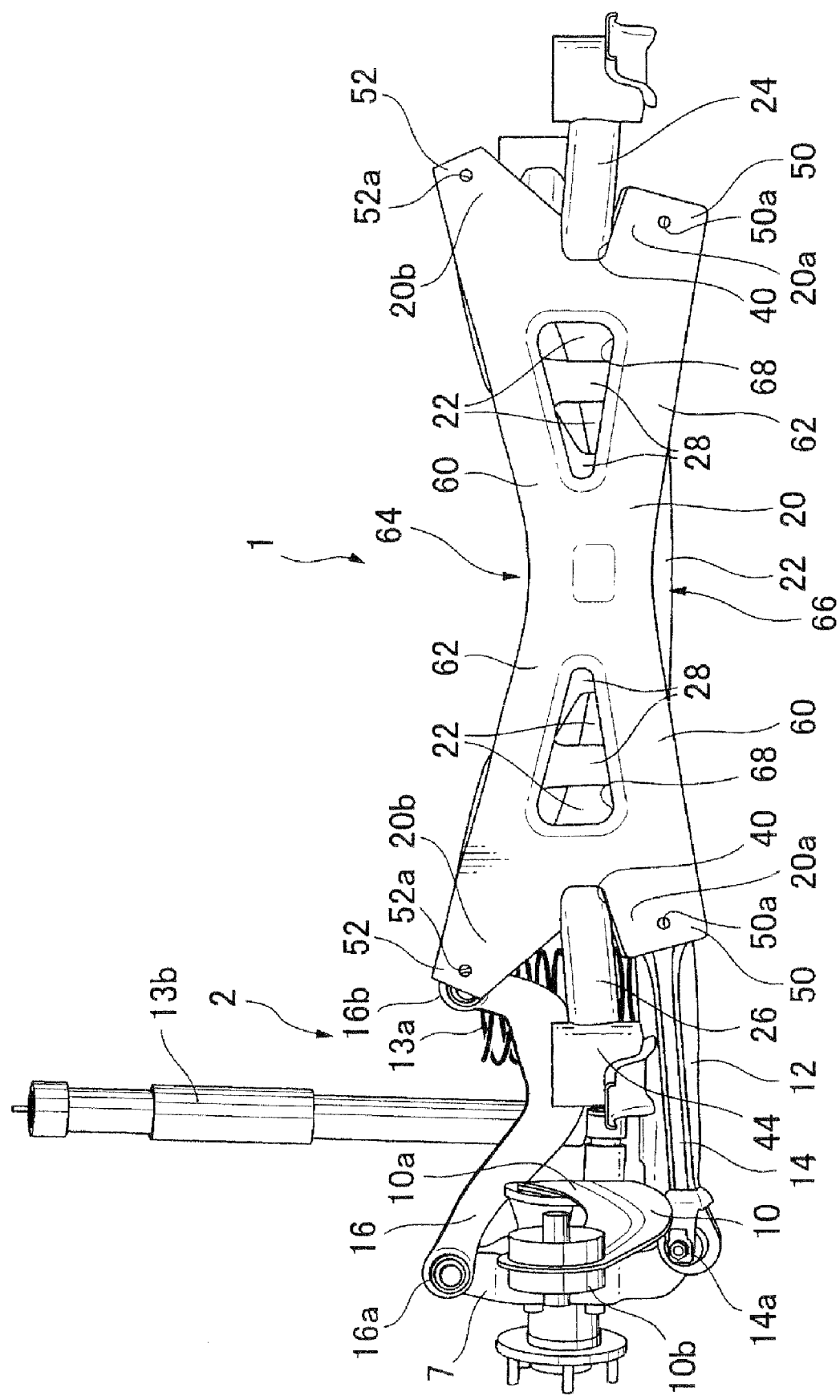
FIG. 3 is a front view showing the rear underbody structure with the suspension subframe structure according to the embodiment.
Figure 4:
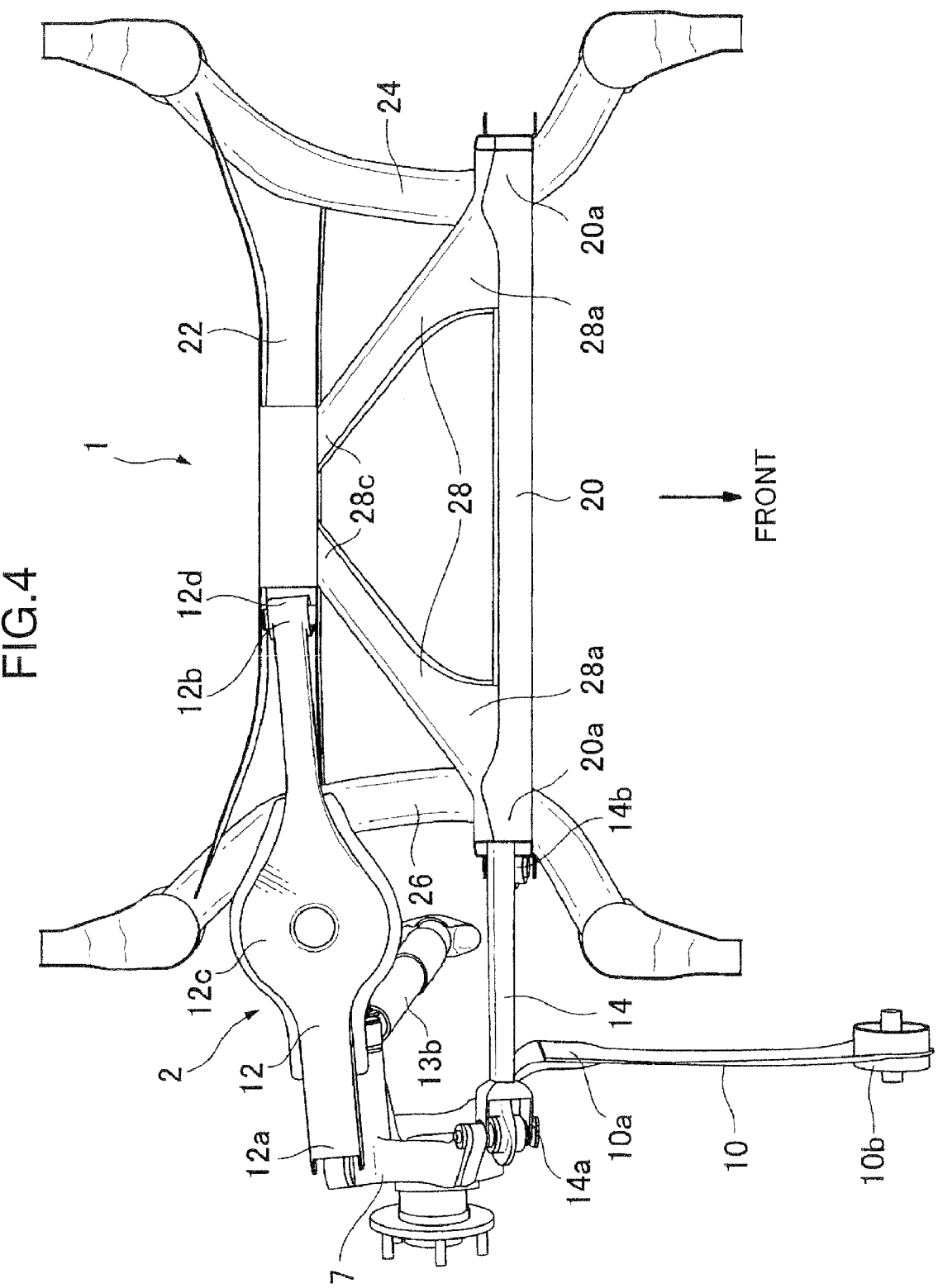
FIG. 4 is a bottom view showing the rear underbody structure with the suspension subframe structure according to the embodiment.

Firstly, with reference to FIGS. 1 to 4, a rear underbody structure of a vehicle comprising a suspension subframe structure according to one embodiment of the present invention will be described. FIG. 1 is a perspective view showing the rear underbody structure with the suspension subframe structure according to the embodiment, when viewed from a front and left side thereof and obliquely from thereabove, and FIG. 2 is a perspective view showing a right rear suspension system and a right rear wheel assembly mounted to the suspension subframe structure according to the embodiment, when viewed from a front and left side thereof and obliquely from thereabove. FIG. 3 is a front view showing the rear underbody structure with the suspension subframe structure according to the embodiment, and FIG. 4 is a bottom view showing the rear underbody structure with the suspension subframe structure according to the embodiment.

As shown in FIG. 1, the rear underbody structure with the suspension subframe structure according to the embodiment comprises a rear suspension subframe 1, a pair of right and left rear suspension systems 2 (only a right rear suspension system is illustrated in FIG. 1), and a pair of right and left rear wheel assemblies 3 (only a right rear wheel assembly is illustrated in FIG. 1). In the following description, as for a pair of components arranged bilaterally symmetrically (e.g., the right and left rear suspension systems 2 and the right and left rear wheel assemblies 3), only one of the components will be mainly described, and detailed description about the other component will be omitted on a case-by-case basis. Further, respective components of the right and left rear suspension systems 2 will be distinguished from each other by appending "right" and "left", respectively, to each component name, according to need.

As shown in FIGS. 1 and 2, the rear wheel assembly 3 comprises a tire 5, a wheel (disk wheel) 6 and a wheel support member 7.

The rear suspension system 2 includes a trailing arm 10 which has a rear end 10a mounted to the wheel support member 7, and extends from the rear end 10a in a frontward direction of a vehicle body (not shown) to have a front end 10b mounted to the vehicle body.

The rear suspension system 2 also includes a rear lower arm 12 disposed on a rearward side thereof to extend in a widthwise (i.e., lateral) direction of the vehicle body. The rear lower arm 12 has an outward end 12a mounted to the wheel support member 7, and an inward end 12b mounted to the rear suspension subframe 1. The rear suspension system 2 further includes a shock absorbing mechanism 13 comprised of a coil spring 13a and a damper 13b and mounted to the rear lower arm 12. The spring 13a has a lower end received in a spring-receiving portion 12c of the rear lower arm 12, and an upper end mounted to the vehicle body. The damper 13b has a lower end mounted to the wheel support member 7, and an upper end mounted to the vehicle body.

The rear suspension system 2 further includes a front lower arm 14 disposed on a frontward and lower side thereof to extend in the lateral direction. The front lower arm 14 has an outward end 14a mounted to the wheel support member 7, and an inward end 14b mounted to the rear suspension subframe 1.

The rear suspension system 2 further includes a front upper arm 16 disposed on a frontward and upper side thereof to extend in the lateral direction. The front upper arm 16 has an outward end 16a mounted to the wheel support member 7, and an inward end 16b mounted to the rear suspension subframe 1.

Figure 5:
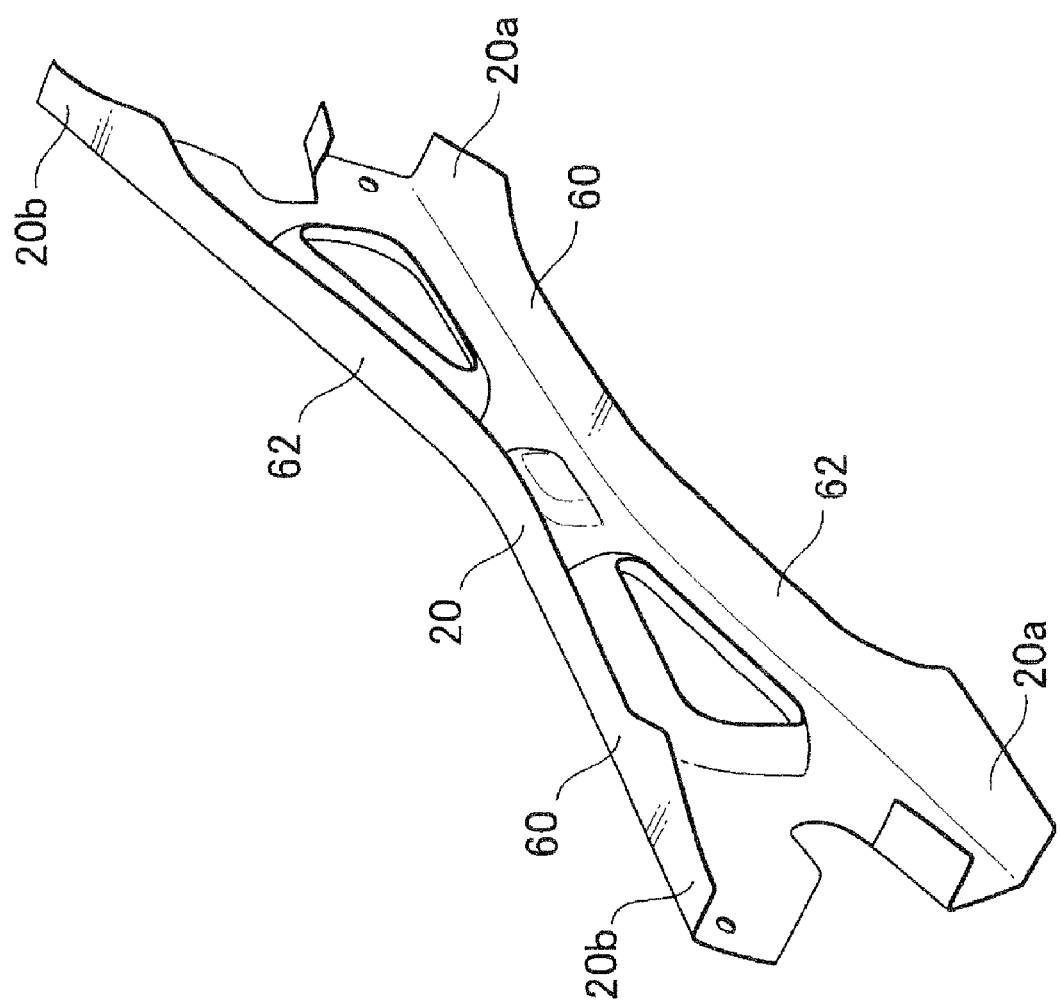
FIG. 5 is a perspective view singly showing a front lateral member in the suspension subframe structure according to the embodiment, when viewed from a rear and left side thereof and obliquely from thereabove.
Figure 6:
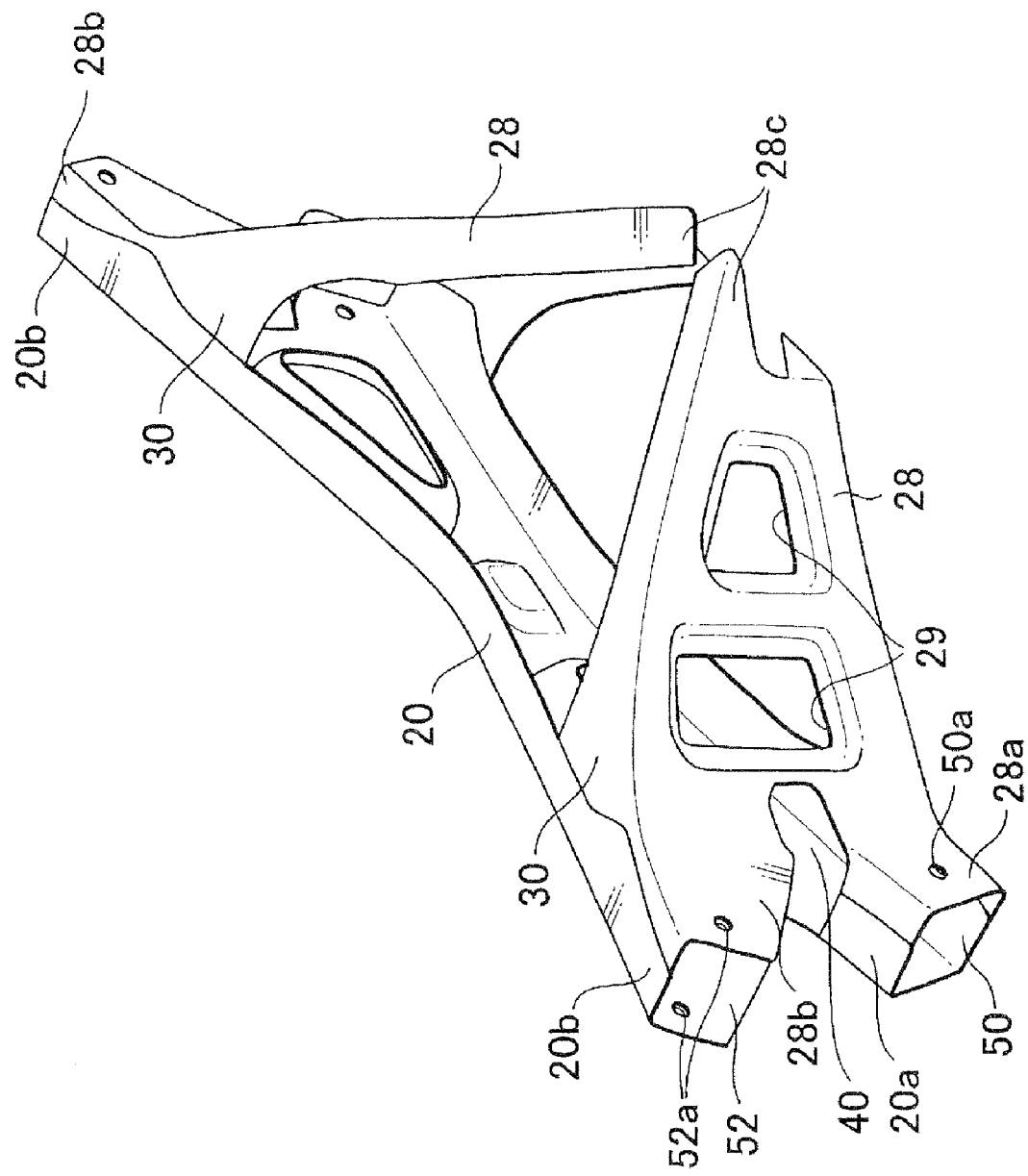
FIG. 6 is a perspective view showing an assembly of the front lateral member and two inclined reinforcing members in the suspension subframe structure according to the embodiment, when viewed from a rear and left side thereof and obliquely from thereabove.
Figure 7:
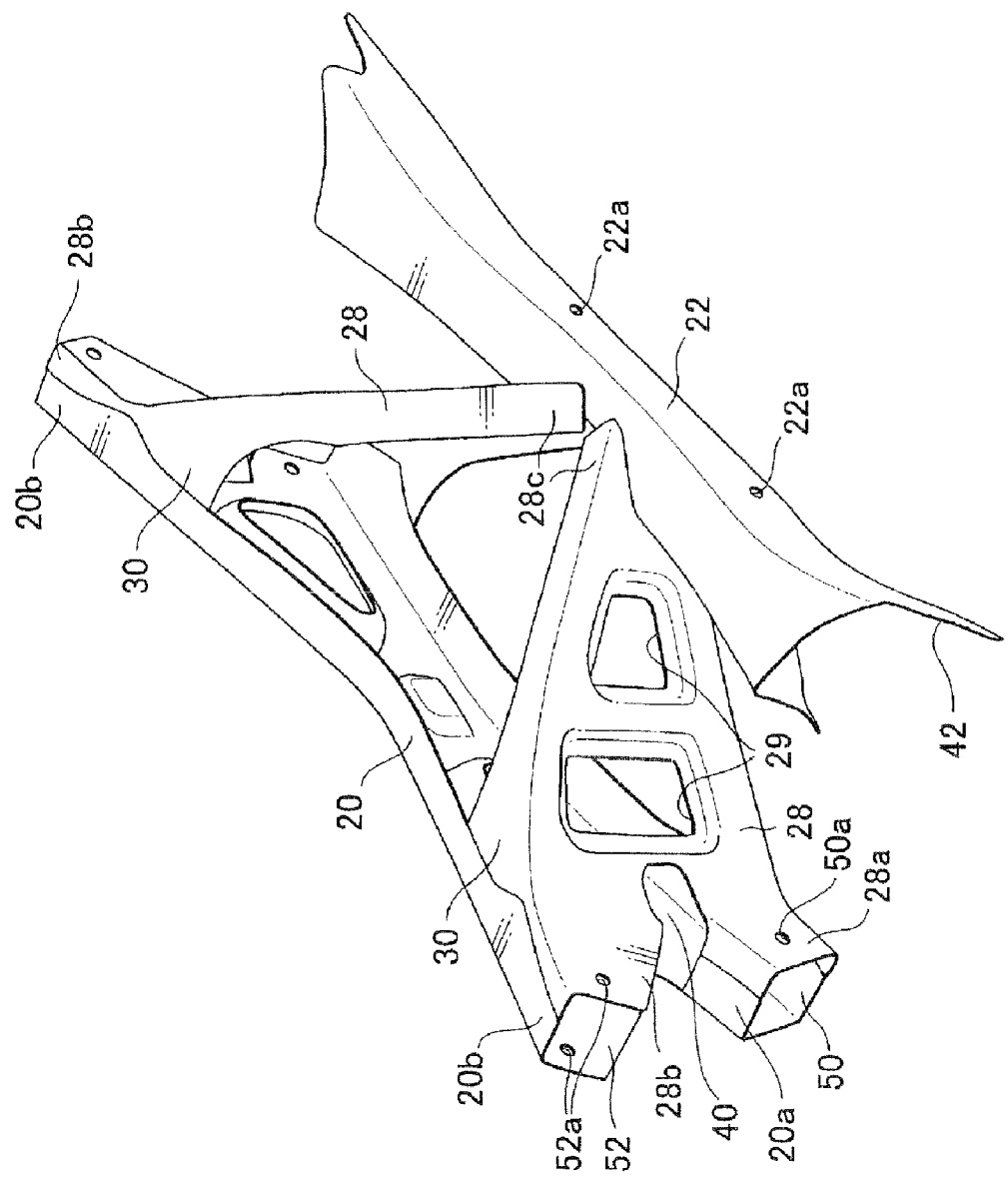
FIG. 7 is a perspective view showing an assembly of the front lateral member, the inclined reinforcing members and a rear lateral member in the suspension subframe structure according to the embodiment, when viewed from a rear and left side thereof and obliquely from thereabove.
Figure 8:
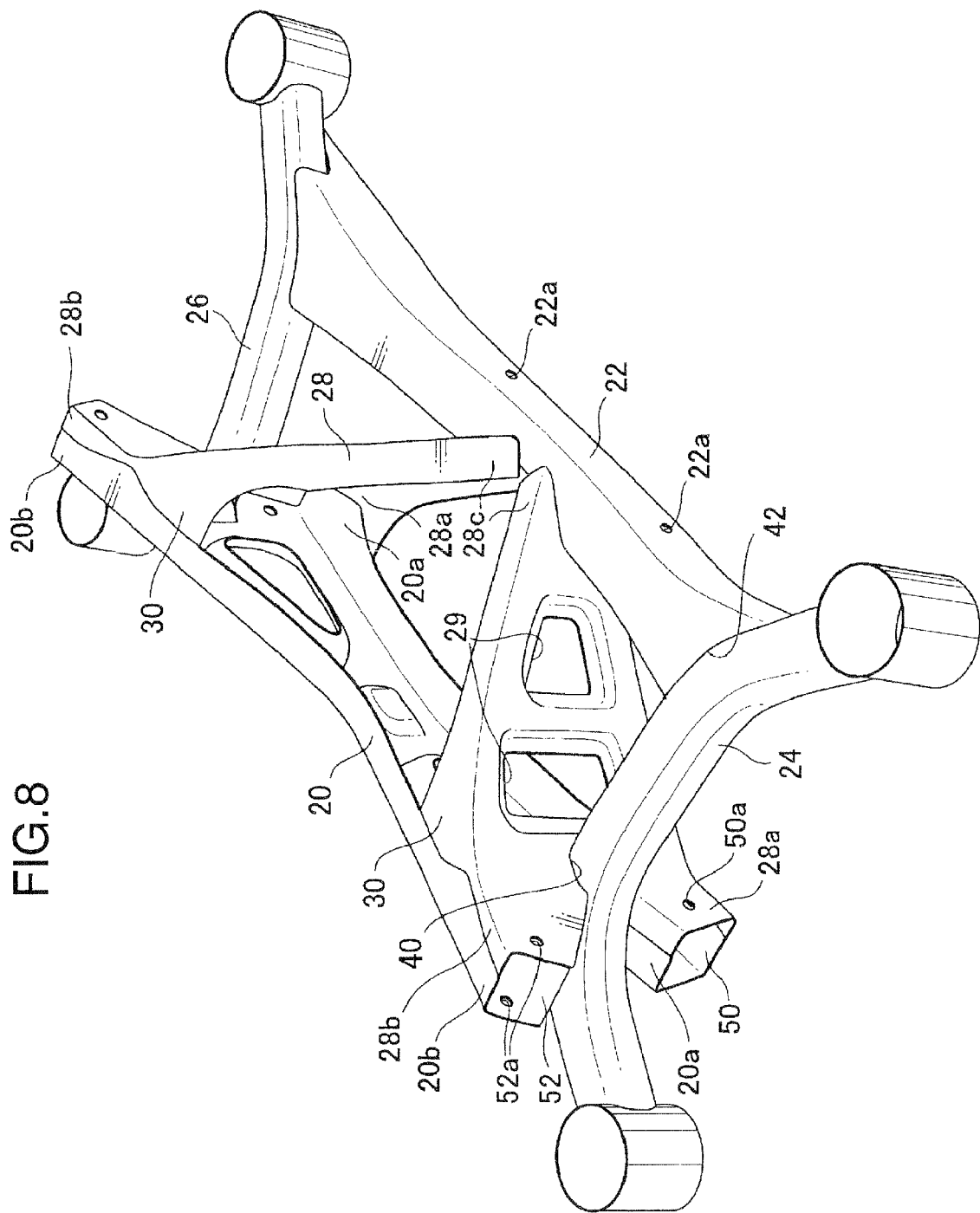
FIG. 8 is a perspective view showing an assembly of the front lateral member, the inclined reinforcing members, the rear lateral member and right and left longitudinal members in the suspension subframe structure according to the embodiment, when viewed from a rear and left side thereof and obliquely from thereabove.
Figure 9:
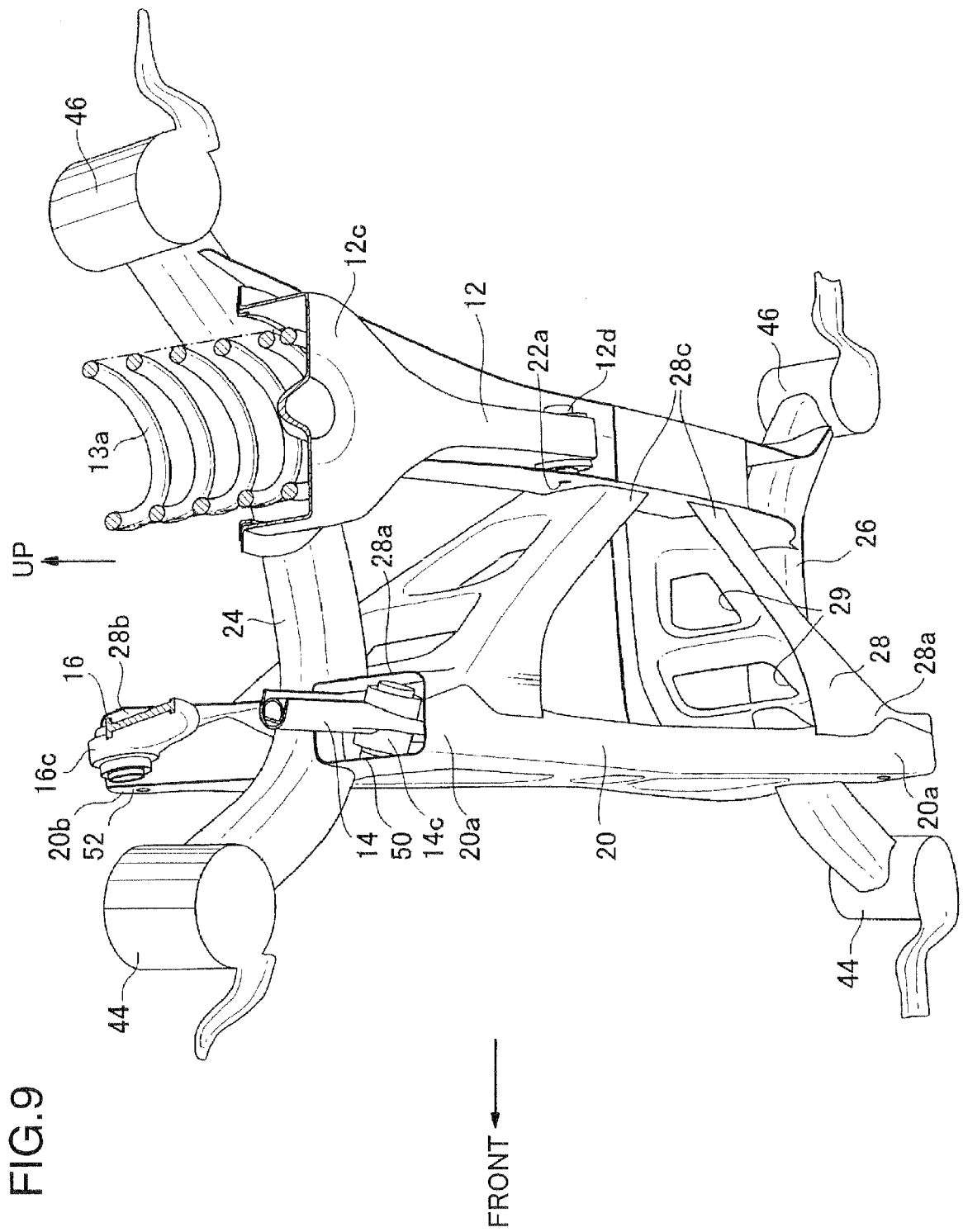
FIG. 9 is a perspective view showing the suspension subframe structure according to the embodiment, when viewed from therebelow and from a right side thereof.
Figure 10:
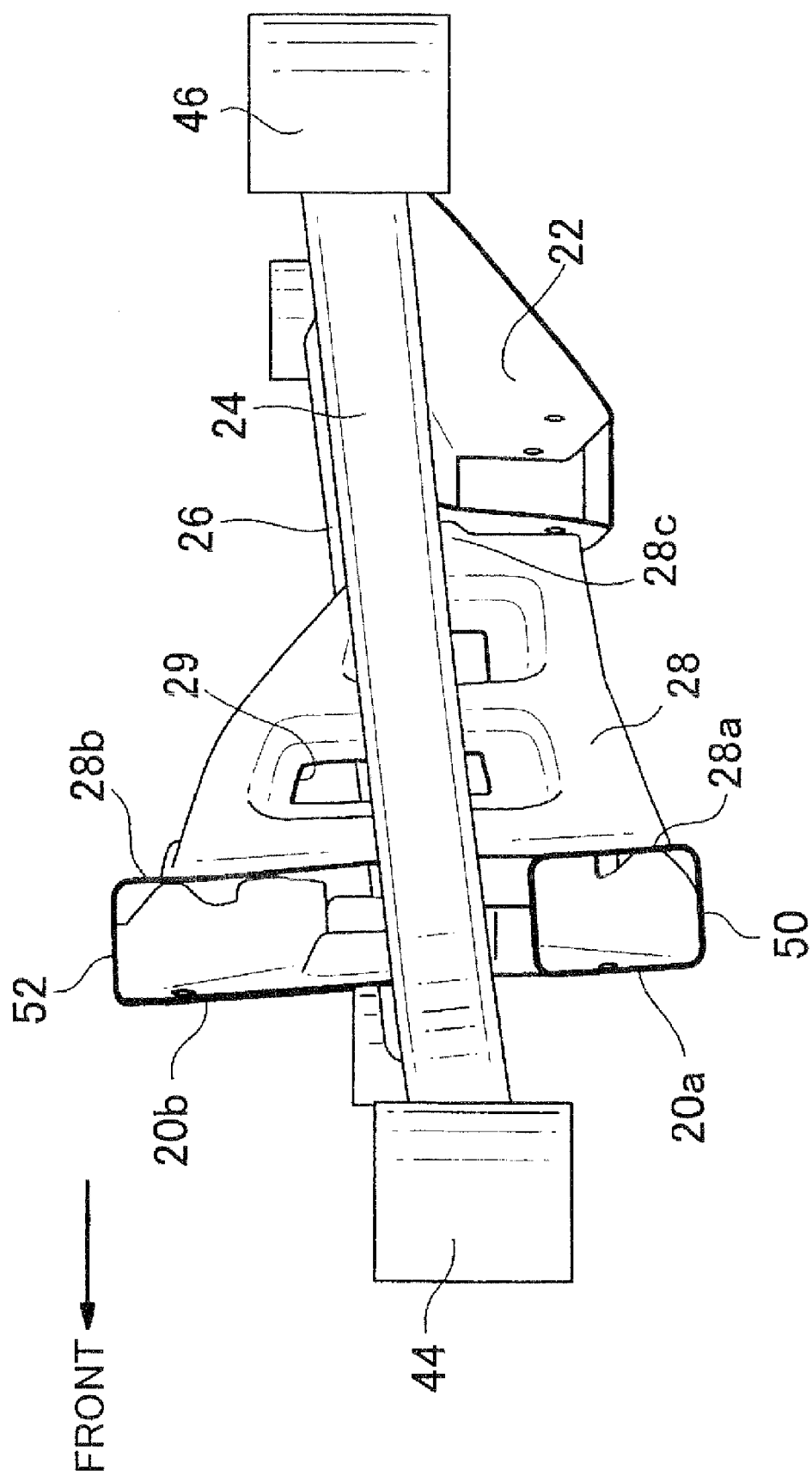
FIG. 10 is a left side view showing the suspension subframe structure according to the embodiment.

With reference to FIGS. 1 and 3 to 10, a structure of the rear suspension subframe 1 will be described below. FIG. 5 is a perspective view singly showing a front lateral member in the suspension subframe structure according to the embodiment, when viewed from a rear and left side thereof and obliquely from thereabove, and FIG. 6 is a perspective view showing an assembly of the front lateral member and two inclined reinforcing members in the suspension subframe structure according to the embodiment, when viewed from a rear and left side thereof and obliquely from thereabove. FIG. 7 is a perspective view showing an assembly of the front lateral member, the inclined reinforcing members and a rear lateral member in the suspension subframe structure according to the embodiment, when viewed from a rear and left side thereof and obliquely from thereabove, and FIG. 8 is a perspective view showing an assembly of the front lateral member, the inclined reinforcing members, the rear lateral member and right and left longitudinal members in the suspension subframe structure according to the embodiment, when viewed from a rear and left side thereof and obliquely from thereabove. FIG. 9 is a perspective view showing the suspension subframe structure according to the embodiment, when viewed from therebelow and from a right side thereof, and FIG. 10 is a left side view showing the suspension subframe structure according to the embodiment.

As shown in FIGS. 1, 3 and 4, the rear suspension subframe 1 comprises a front lateral member 20 disposed on a frontward side of the rear suspension subframe 1 to extend in the lateral direction, a rear lateral member 22 disposed on a rearward side of the rear suspension subframe 1 to extend in the lateral direction, a left longitudinal member 24 disposed on a left side of the rear suspension subframe 1 to extend in a frontward-rearward (i.e., longitudinal) direction of the vehicle body, a right longitudinal member 26 disposed on a right side of the rear suspension subframe 1 to extend in the longitudinal direction, and first and second (right and left) inclined reinforcing members 28 each extending obliquely relative to the lateral direction in top plan view.

As shown in FIG. 5, the front lateral member 20 is a single-piece member generally formed in a cross-sectionally angular C shape having an opening facing rearwardly. As shown in FIG. 6, each of the first and second inclined reinforcing members 28 is a single-piece member generally formed in a cross-sectionally angular C shape having an opening facing frontwardly. As shown in FIGS. 1, 4 and 6, the front lateral member 20 and each of the first and second inclined reinforcing members 28 are arranged such that the respective openings thereof are positioned in opposed relation to each other, and fixed to each other by welding.

As shown in FIGS. 1 and 6, in a state after the front lateral member 20 and each of the first and second inclined reinforcing members 28 are fixed together, a portion indicated by the reference numeral 30 is formed to have a closed cross-section so as to increase rigidity of the rear suspension subframe 1. As shown in FIG. 7, the rear lateral member 22 is generally formed in a cross-sectionally angular C shape having an opening facing downwardly. As shown in FIGS. 1, 4 and 7, each of the first and second inclined reinforcing members 28 has a rear end 28c fixed to the rear lateral member 22 by welding.

As shown in FIG. 7, right and left open portions 40 (only a left open portion appears in FIG. 7) are formed between the front lateral member 20 and the first (right) inclined reinforcing member 28 and between the front lateral member 20 and the second (left) inclined reinforcing member 28, respectively. These open portions 40 are formed by connecting the first and second inclined reinforcing members 28 to the front lateral member 20. Specifically, each of the open portions 40 has a front region formed by the front lateral member 20, and a rear region formed by a corresponding one of the first and second inclined reinforcing members 28. Further, right and left open portions 42 are formed by respective opposite lateral edges of the rear lateral member 22.

The left and right longitudinal members 24, 26 are mounted to the left and right open portions 40, respectively, as will be described later. Each of the open portions 40 serving as mounting portions for the longitudinal members 24, 26 defines an opening consisting of a lower opening region facing upwardly, an upper opening region facing downwardly, and a laterally inward opening region facing outwardly. As shown in FIG. 3, each of the open portions 40 also defines an opening facing frontwardly and rearwardly (i.e., has a laterally inwardly concaved shape), when viewed in the longitudinal direction. Although each of the open portions 40 in this embodiment is formed to have an open cross-section, it may be formed to have a closed cross-section to further increase the rigidity of the rear suspension subframe 1.

Then, the left longitudinal member 24 is fixedly mounted to the left open portions 40, 42 by welding, and the right longitudinal member 26 is fixedly mounted to the right openings 40, 42 by welding. In this manner, the rear suspension subframe 1 as shown in FIGS. 1 and 8 is formed. Each of the left and right longitudinal members 24, 26 has a front end and a rear end provided with a front mount portion 44 and a rear mount portion 46, respectively. The rear suspension subframe 1 is mounted to the vehicle body through the front and rear mount portions 44, 46.

As shown in FIGS. 1, 3 and 8, each of right and left ends of the front lateral member 20 is formed as branched lower and upper ends 20a, 20b, and a front end of each of the first and second inclined reinforcing members 28 is also formed as branched lower and upper ends 28a, 28b. The ends 20a, 20b of the front lateral member 20 are connected to respective ones of the ends 28a, 28b to form a mounting portion 50 for the front lower arm 14 and a mounting portion 52 for the front upper arm 16.

More specifically, as shown in FIGS. 6 and 10, the front lateral member 20 has right and left lower ends 20a (each formed in a cross-sectionally angular C shape having an opening facing rearwardly), and the first and second inclined reinforcing members 28 have right and left lower ends 28a (each formed in a cross-sectionally angular C shape having an opening facing frontwardly), respectively. The right and left lower ends 20a of the front lateral member 20 are combined with corresponding ones of the right and left lower ends 28a of the first and second inclined reinforcing members 28, to form right and left mounting portions 50 for the right and left front lower arms 14 (right and left front-lower-arm support portions 50) each having a closed cross-section.

Further, as shown in FIGS. 6 and 10, the front lateral member 20 has right and left upper ends 20b (each formed in a cross-sectionally L shape), and the first and second inclined reinforcing members 28 have right and left upper ends 28b (each formed in a cross-sectionally L shape), respectively. The right and left upper ends 20b of the front lateral member 20 are combined with corresponding ones of the right and left upper ends 28b of the first and second inclined reinforcing members 28 to form right and left mounting portions 52 for the right and left front upper arms 16 (right and left front-upper-arm support portions 52) each having an open cross-section with an opening facing downwardly.

As shown in FIGS. 1, 3 and 8, each of the mounting portions 50 is formed with a hole 50a for mounting a rubber bush 14c (see FIG. 9) provided at the laterally inward end of the front lower arm 14, and each of the mounting portions 52 is formed with a hole 52a for mounting a rubber bush 16c (see FIG. 9) provided at the laterally inward end of the front upper arm 16. Thus, as shown in FIG. 9, the front lower arms 14 and the front upper arms 16 are mounted to the assembly of the front lateral member 20 and the first and second inclined reinforcing members 28 (only the right front lower arm 14 and the right front upper arm 16 are shown in FIG. 9).

As shown in FIGS. 8 and 9, the rear lateral member 22 is also formed with two holes 22a. Thus, as shown in FIGS. 4 and 9, a rubber bush 12d provided at the laterally inward end of the rear lower arm 12 is mounted to the rear lateral member 22 through one of the hole 22a (only the right rear lower arm 12 is shown in FIGS. 4 and 9). The rear end 28 of each of the first and second inclined reinforcing members 28 is weldingly fixed to the rear lateral member 22 in a vicinity of this mounting portion for the rear lower arm 12 (rear-lower-arm support portion) to increase rigidity of the mounting portion 22b for mounting the rear lower arm 12 to the rear suspension subframe 1. It is understood that the rear end 28 of each of the first and second inclined reinforcing members 28 may be fixed to the mounting portion 22b.

As shown in FIGS. 1, 3 and 5, the front lateral member 20 is formed to have a frame portion 60 extending approximately linearly to diagonally connect the left upper end 20b provided with the mounting portion 52 for the left front upper arm 16 and the right lower end 20a provided with the mounting portion 50 for the right front lower arm 14, and a frame portion 62 extending approximately linearly to diagonally connect the right upper end 20b provided with the mounting portion 52 for the right front upper arm 16 and the left lower end 20a provided with the mounting portion 50 for the left front lower arm 14. Thus, based on the frame portions 60, 62, the front lateral member 20 is formed in a generally X shape.

More specifically, as shown in FIG. 3, the front lateral member 20 has an upper portion and a lower portion formed, respectively, as a downwardly-concaved portion 64 and an upwardly concaved portion 66, in such a manner that a vertical length (i.e., height dimension) of the front lateral member 20 gradually decreases from each of the right and left ends thereof in a laterally inward direction of the vehicle body. Further, the front lateral member 20 is formed with a pair of openings 68 each having a vertical length (i.e., height dimension) which gradually decreases in the laterally inward direction. Based on the concaved portions 64, 66 and the openings 68, the front lateral member 20 is formed in a generally X shape in front view.

As shown in FIG. 3, each of the right and left ends of the front lateral member 20 is formed such that each of the right and left front-upper-arm support portions is connected to a corresponding one of the right and left front-lower-arm support portions in an upward-downward direction. Further, the front lateral member 20 is provided with the right and left mounting portions 50 for the right and left front lower arms 14 and the right and left mounting portions 52 for the right and left front upper arms 16, wherein each of the right and left mounting portions 50 and a corresponding one of the right and left mounting portions 52 are located above and below a corresponding one of the right and left longitudinal members 24, 26 so as to interpose the longitudinal member therebetween.

In the same manner, the first and second inclined reinforcing members 28 is provided, respectively, with the right mounting portions 50, 52 for the right front lower arm 14 and the right front upper arm 16, and the left mounting portions 50, 52 for the left front lower arm 14 and the left front upper arm 16, wherein each of the right and left mounting portions 50 and a corresponding one of the right and left mounting portions 52 are located above and below a corresponding one of the right and left longitudinal members 24, 26 so as to interpose the longitudinal member therebetween, as mentioned above. Further, as shown in FIGS. 4 and 8, each of the first and second inclined reinforcing members 28 is arranged to extend from corresponding ones of the mounting portions 50, 52 thereof in the laterally inward direction and obliquely rearwardly in top plan view, and fixed to a laterally intermediate portion of the rear lateral member 22 through the rear end 28c thereof.

Further, as shown in FIG. 8, each of the first and second inclined reinforcing members 28 is formed to have a height dimension which gradually decreases in a direction from corresponding ones of the mounting portions 50, 52 thereof in the right and left ends of the front lateral member 20 toward a laterally intermediate portion of the rear lateral member 22. As shown in FIG. 8, each of the first and second inclined reinforcing members 28 is formed with two openings 29 each having a height dimension which gradually decreases in the direction from corresponding ones of the mounting portions 50, 52 thereof in the right and left ends of the front lateral member 20 toward the laterally intermediate portion of the rear lateral member 22.

Figure 11:
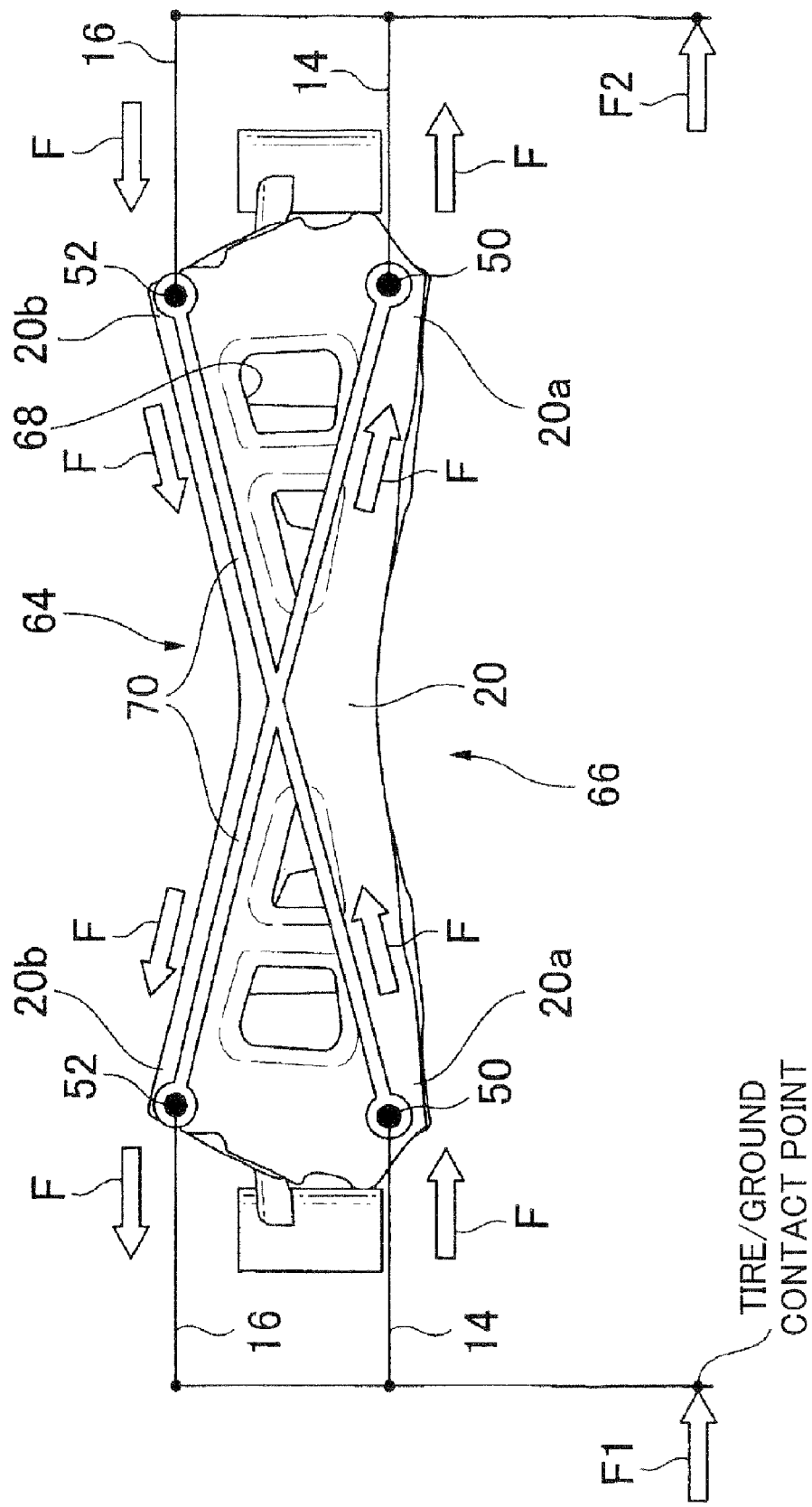
FIG. 11 is an explanatory front view showing one example of an operation of the suspension subframe structure according to the embodiment.

With reference to FIG. 11, a function and advantage of the suspension sub-frame structure according to the embodiment will be described below. FIG. 11 is an explanatory front view showing one example of an operation of the suspension sub-frame structure according to the embodiment.

The right and left mounting portions 50 for the right and left front lower arms 14 (right and left front-lower-arm support portions 50) are provided in respective ones of the right and left lower ends 20a of the front lateral member 20, and the right and left mounting portions 52 for the right and left front upper arms 16 (right and left front-upper-arm support portions 52) are provided in respective ones of the right and left upper ends 20b of the front lateral member 20. Further, based on the concaved portions 64, 66 and the openings 68, the front lateral member 20 is formed to extend in a generally X shape in front view, as mentioned above. For example, the front lateral member 20 extends along the diagonal lines indicated by the reference numeral 70 in FIG. 11.

Given that loads F1, F2 are applied to the right and left wheel assemblies 3 at tire/ground contact points thereof, respectively, during turning of the vehicle. In this case, a load F is transmitted to each of the right and left front lower arms 14 and the right and left front upper arms 16, in the direction as shown in FIG. 11. Specifically, during clockwise turning of the vehicle on an assumption that right and left wheel assemblies 3 have the same phase at a tire/ground contact point, a load compressing the front lateral member 20 is applied to a left lower arm 14 and to a right upper arm 16 diagonally aligned with the left lower arm 14, and a load tensioning the front lateral member 20 is applied to a left upper arm 16 and to a right lower arm 14 diagonally aligned with the left upper arm 16.

In the suspension subframe structure according to this embodiment, as measures against such lateral loads, the front lateral member 20 is formed to extend in a generally X shape in front view. Thus, the front lateral member 20 allows the loads applied to the arms 14, 16 to be efficiently transmitted diagonally to effectively cancel out the right and left loads. More specifically, the front lateral member 20 is formed to allow a load to be transmitted diagonally between the mounting portion 50 for the left front lower arm 14 and the mounting portion 52 for the right front upper arm 16 and diagonally between the mounting portion 50 for the right front lower arm 14 and the mounting portion 52 for the left front upper arm 16.

Thus, even if a large input load is applied to the right and left front lower arms 14 and the right and left front upper arms 16 during turning of the vehicle, the front lateral member 20 can effectively support the arms 14, 16 to cancel out the loads from right and left sides. This makes it possible to improve rigidity of the rear suspension subframe 1 to effectively receive a load from the arms 14, 16, while reducing a weight of the rear suspension subframe 1.

In the suspension subframe structure according to this embodiment, each of the right and left rear suspension system 2 is a multi-link rear suspension, and the right and left mounting portions 50 for the right and left front lower arms 14 and the right and left mounting portion 52 for the right and left front upper arms 16 are formed in the front lateral member 20. Thus, during turning of the vehicle, relatively large input loads of the front lower and upper arms 14, 16 can be effectively received by the front lateral member 20.

In the suspension subframe structure according to this embodiment, each of the right and left rear suspension system 2 is a multi-link rear suspension which comprises the trailing arm 10 extending from the wheel support member 7 in the frontward direction of the vehicle body, and the front lower arm 14 and the front upper arm 16 each extending from the wheel support member 7 in the laterally inward direction of the vehicle body, and the right and left mounting portions 50, 52 are provided in the front lateral member 20 to support the front lower and upper arms 14, 16. Thus, during turning of the vehicle, relatively large input loads of the front lower and upper arms 14, 16 can be effectively received by the front lateral member 20. In addition, the right and left mounting portions 50, 52 are also provided in the first and second inclined reinforcing members 28. Thus, during turning of the vehicle, the relatively large input loads of the front lower and upper arms 14, 16 can be effectively received by the first and second inclined reinforcing members 28 and the rear lateral member 22.

In the suspension subframe structure according to this embodiment, each of the right and left rear suspension system 2 is a multi-link rear suspension which comprises the front lower arm 14, the front upper arm 16, and the rear lower arm 12 disposed rearward of the front lower arm 14 and the front upper arm 16, wherein the rear lower arm 12 is supported by the rear lateral member 22 in a vicinity of a position where a corresponding one of the first and second inclined reinforcing members 28 is connected to the rear lateral member 22. This makes it possible to further increase rigidity for supporting the rear lower arm 12 by the inclined reinforcing member 28 and the rear lateral member 22. The rear lower arm 12 may be supported by the rear lateral member 22 in the position where the corresponding one of the first and second inclined reinforcing members 28 is connected to the rear lateral member 22, to obtain the same advantage.

The suspension subframe structure according to this embodiment comprises the front lateral member 20, the rear lateral member 22, and the first and second inclined reinforcing members 28. The first inclined reinforcing member 28 is arranged to extend in the lateral direction and obliquely rearwardly in top plan view to connect the right end of the front lateral member 20 and the laterally intermediate portion of the rear lateral member 22, and the second inclined reinforcing member 28 is arranged to extend in the laterally direction and obliquely rearwardly in top plan view to connect the left end of the front lateral member 20 and the laterally intermediate portion of the rear lateral member 22, wherein the right and left lower ends 20$a$ of the front lateral member 20 are connected to respective ones of the right and left lower ends 28$a$ of the first and second inclined reinforcing members 28 to form the right and left mounting portions 50 for the right and left front lower arms 14 (right and left front-lower-arm support portions 50), and the right and left upper ends 20$b$ of the front lateral member 20 are connected to respective ones of the right and left upper ends 28$b$ of the first and second inclined reinforcing members 28 to form the right and left mounting portions 52 for the right and left front upper arms 16 (right and left front-upper-arm support portions 52). Thus, when a large lateral input load is applied to each of the mounting portions 50, 52 for the front lower and upper arms 14, 16 during turning of the vehicle, it is transmitted from each of the mounting portions 50, 52 to the front lateral member 20 and the first and second inclined reinforcing members 28, and then transmitted from the first and second inclined reinforcing members 28 to the rear lateral member 22, so that the load can be effectively received by the front lateral member 20, the first and second inclined reinforcing members 28 and the rear lateral member 22. That is, the first and second inclined reinforcing members 28, the front lateral member 20 and the rear lateral member 22 make up a frame configuration capable of effectively receiving a load. This makes it possible to improve rigidity of the rear suspension subframe 1 while reducing the weight of the rear suspension subframe 1.

In the suspension subframe structure according to this embodiment, the lower and upper ends 28$a$, 28$b$ of each of the first and second inclined reinforcing members 28 are formed as the mounting portions 50, 52 for the front lower and upper arms 14, 16, and connected to the laterally intermediate portion of the rear lateral member 22. Thus, when a large lateral input load is applied to each of the mounting portions (support portions) 50, 52 for the front lower and upper arms 14, 16 during turning of the vehicle, it is transmitted from each of the mounting portions 50, 52 to the first and second inclined reinforcing members 28 and then to the rear lateral member 22. Each of the first and second inclined reinforcing members 28 extends obliquely relative to the lateral direction in top plan view, to form an approximately triangular-shaped frame portion in which the rear lateral member 22 and each of the first and second inclined reinforcing members 28 serve as two sides of the triangular shape. This makes it possible to improve rigidity of the rear suspension subframe 1 to effectively receive a load from the front lower and upper arms 14, 16, while reducing the weight of the rear suspension subframe 1.

In the suspension subframe structure according to this embodiment, the right and left mounting portions 50 for the right and left front lower arms 14 and the right and left mounting portions 52 for the right and left front upper arms 16 are integrally formed in the front lateral member 20. Thus, a load from each of the front lower and upper arms 14, 16 can be efficiently transmitted to the front lateral member 20. In the same manner, the right and left mounting portions 50 for the right and left front lower arms 14 and the right and left mounting portions 52 for the right and left front upper arms 16 are integrally formed in the first and second inclined reinforcing members 28. Thus, the load from each of the front lower and upper arms 14, 16 can also be efficiently transmitted to the first and second inclined reinforcing members 28.

In the suspension subframe structure according to this embodiment, the right and left mounting portions 50 for the right and left front lower arms 14 and the right and left mounting portions 52 for the right and left front upper arms 16 are formed by integrally combining the front lateral member 20 with the first and second inclined reinforcing members 28. Thus, a load from each of the front lower and upper arms 14, 16 can be effectively received by the front lateral member 20, the first and second inclined reinforcing members 28 and the rear lateral member 22 and efficiently transmitted to the front lateral member 20, the first and second inclined reinforcing members 28 and the rear lateral member 22.

In the suspension subframe structure according to this embodiment, each of the right and left mounting portions 52 for the right and left front upper arms 16 is formed to have a cross-sectionally angular C shape, by integrally combining each of the right and left upper ends 20$b$ of the front lateral member 20 with a corresponding one of the right and left upper ends 28$b$ of the first and second inclined reinforcing members 28. This makes it possible to improve rigidity of the right and left mounting portions 52 for the right and left front upper arms 16, and allow a component, such as the rubber bush 16$c$ of the front upper arm 16 or a rotatable rod, to be installed inside the angular C-shaped portion so as to promote effective utilization of space.

In the suspension subframe structure according to this embodiment, each of the right and left mounting portions 50 for the right and left front lower arms 14 is formed to have a closed cross-section, by integrally combining each of the right and left lower ends 20$a$ of the front lateral member 20 with a corresponding one of the right and left lower ends 28$a$ of the first and second inclined reinforcing members 28. This makes it possible to improve rigidity of the right and left mounting portions 50 for the right and left front lower arms 14, and allow a component, such as the rubber bush 14$c$ of the front lower arm 14 or a rotatable rod, to be installed inside the angular C-shaped portion so as to promote effective utilization of space. Generally, each of the right and left front lower arms 14 is likely to receive a larger load than that in other arm during turning of the vehicle. In this embodiment, each of the right and left mounting portions 50 for the right and left front lower arms 14 is formed to have a closed cross-section to increase rigidity thereof. This makes it possible to effectively support the right and left front lower arms 14.

In the suspension subframe structure according to this embodiment, a laterally intermediate portion of the front lateral member 20 has a height dimension less than that of each of the right and left ends thereof. Thus, loads applied to the respective front lower and upper arms 14, 16 can be efficiently transmitted through the front lateral member 20 in two diagonal directions to cancel out the loads, as mentioned above. Further, the upper and lower portions of the front lateral member 20 are formed, respectively, as downwardly-concaved and upwardly-concaved portions 64, 66. This makes it possible to remove a portion unnecessary for the diagonal load transmission so as to facilitate reduction in weight of the front lateral member 20 to reduce the weight of the rear suspension subframe 1.

Further, the front lateral member 20 is formed with the pair of openings 68 each having a height dimension which gradually decreases in a direction from an adjacent one of the right and left ends toward the laterally intermediate portion of the front lateral member 20. This makes it possible to remove a portion unnecessary for the diagonal load transmission so as to facilitate the reduction in weight of the front lateral member 20 to further reduce the weight of the rear suspension subframe 1.

In the suspension subframe structure according to this embodiment, each of the first and second inclined reinforcing members 28 is formed to have a height dimension which gradually decreases in a direction from the ends 28a, 28b thereof toward the laterally intermediate portion of the rear lateral member 22. This makes it possible to remove a portion unnecessary for transmitting a load applied to each of the front lower and upper arms 14, 16 so as to facilitate the reduction in weight of the first and second inclined reinforcing members 28 to further reduce the weight of the rear suspension subframe 1.

Further, each of the first and second inclined reinforcing members 28 is formed with the two openings 29 each having a height dimension which gradually decreases in a direction from the mounting portions 50, 52 thereof in each of the right and left ends of the front lateral member 20 toward the laterally intermediate portion of the rear lateral member 22. This makes it possible to remove a portion unnecessary for transmitting a load applied to each of the front lower and upper arms 14, 16 so as to facilitate the reduction in weight of the first and second inclined reinforcing members 28 to further reduce the weight of the rear suspension subframe 1.

In the suspension subframe structure according to this embodiment, each of the right and left ends of the front lateral member 20 is formed such that each of the right and left mounting portions 50 for the right and left front lower arms 14 is connected to a corresponding one of the right and left mounting portions 52 for the right and left front upper arms 16 in an upward-downward direction. This makes it possible to improve both rigidly of the front lateral member 20 and rigidity of the mounting portions (support portions) 50, 52 for the front lower and upper arms 14, 16. Further, each of the right and left ends of the first and second inclined reinforcing members 28 is formed such that each of the right and left mounting portions 50 for the right and left front lower arms 14 is connected to a corresponding one of the right and left mounting portions 52 for the right and left front upper arms 16 in an upward-downward direction. This makes it possible to improve both rigidity of the first and second inclined reinforcing members 28 and rigidity of the mounting portions (support portions) 50, 52 for the front lower and upper arms 14, 16.

In the suspension subframe structure according to this embodiment, each of the right and left mounting portions 50 for the right and left front lower arms 14 and a corresponding one of the right and left mounting portions 52 for the right and left front upper arms 16 are located above and below a corresponding one of the longitudinal members 24, 26 so as to interpose the longitudinal member therebetween. This makes it possible to facilitate effective utilization of space above and below the longitudinal members 24, 26 so as to reduce an overhang of each of the mounting portions (support portions) 50, 52 for the front lower and upper arms 14, 16, from a corresponding one of the longitudinal members 24, 26 to increase rigidity of the mounting portions (support portions) 50, 52 for the front lower and upper arms 14, 16.

In the suspension subframe structure according to this embodiment, the first and second inclined reinforcing members 28 are connected to the front lateral member 20 in a region between the front-lower-arm support portion 50 and the front-upper-arm support portion 52, and right and left connection portions between the front lateral member 20 and respective ones of the first and second inclined reinforcing members 28 are connected to the right and left longitudinal members 26, 24, respectively. This makes it possible to increase rigidity for connecting the front lateral member 20 and each of the first and second inclined reinforcing members 28 to each of the right and left longitudinal members 26, 24, while improving respective rigidities of the front lateral member 20 and the first and second inclined reinforcing members 28, to increase the rigidity of the rear suspension subframe 1. The rigidity of the rear suspension subframe 1 or each of the support portions 50, 52 may be increased by connecting the front lateral member 20 and respective ones of the first and second inclined reinforcing members 28 to form right and left closed cross-sectional portions therebetween, and connecting the right and left longitudinal members 26, 24 to the right and left closed cross-sectional portions, respectively.

Although the above embodiment has been described based on one example where the multi-link suspension system is an E-type multi-link suspension system, it is understood that the present invention may be applied to a subframe structure for any other suitable type of multi-link suspension system. Further, the rear lateral member 22 may be formed in the same configuration as that of the front lateral member 20 in the above embodiment. In this case, the first and second inclined reinforcing members 28 may be arranged reversely in the longitudinal direction to receive a load from a suspension arm mounted to the rear lateral member 22.

As described above, the present invention may be summarized as follows.

According to one aspect of the present invention, there is provided a suspension subframe structure of a vehicle for supporting a plurality of suspension arms of a multi-link suspension system. The suspension subframe structure comprises: first and second lateral members provided in spaced-apart relation to each other in a longitudinal direction of a vehicle body and each extending in a lateral direction of the vehicle body; a pair of longitudinal members extending in the longitudinal direction in such a manner that one of the longitudinal member connects respective left ends of the first and second lateral members, and the other longitudinal member connects respective right ends of the first and second lateral members; a pair of right and left upper-arm support portions provided in respective ones of the right and left ends of the first lateral member; and a pair of right and left lower-arm support portions provided in respective ones of the right and left ends of the first lateral member, wherein the first lateral member is formed to allow a load to be transmitted diagonally between the left upper-arm support portion and the right lower-arm support portion and diagonally between the left lower-arm support portion and the right upper-arm support portion.

In the suspension subframe structure of the present invention, the right and left upper-arm support portions are provided in respective ones of the right and left ends of the first lateral member, and the right and left lower-arm support portions are provided in respective ones of the right and left ends of the first lateral member. During turning of the vehicle, for example, during clockwise turning on an assumption that right and left wheels have the same phase at a tire/ground contact point, a load compressing the first lateral member is applied to a left lower arm and to a right upper arm diagonally aligned with the left lower arm, and a load tensioning the first lateral member is applied to a left upper arm and to a right lower arm diagonally aligned with the left upper arm. All the loads are lateral loads. In the present invention, as measures against such loads, the first lateral member is formed to allow a load to be transmitted diagonally between the left upper-arm support portion and the right lower-arm support portion and diagonally between the left lower-arm support portion and the right upper-arm support portion. Thus, the first lateral member can effectively support the above suspension arms to cancel out the above large input loads from right and left sides during the turning of the vehicle. This makes it possible to improve rigidity of the suspension subframe to effectively receive a load from the suspension arms, while reducing a weight of the suspension subframe.

Preferably, in the suspension subframe structure of the present invention, the right and left upper-arm support portions and the right and left lower-arm support portions are integrally formed in the first lateral member.

According to this feature, the right and left upper-arm support portions and the right and left lower-arm support portions are integrally formed in the first lateral member. This makes it possible to efficiently transmit a load from each of the arms to the first lateral member.

Preferably, in the suspension subframe structure of the present invention, at least one of upper and lower portions of the first lateral member is formed as a downwardly-concaved or upwardly-concaved portion in such a manner that a laterally intermediate portion of the first lateral member has a height dimension less than that of each of the right and left ends thereof.

According to this feature, the laterally intermediate portion of the first lateral member has a height dimension less than that of each of the right and left ends thereof. Thus, loads applied to the respective arms can be efficiently transmitted through the first lateral member in two diagonal directions to effectively cancel out the loads. Further, the upper and lower portions of the first lateral member are formed, respectively, as downwardly-concaved and upwardly-concaved portions. This makes it possible to remove a portion unnecessary for the diagonal load transmission so as to facilitate reduction in weight of the first lateral member to reduce a weight of the suspension subframe.

Preferably, in the suspension subframe structure of the present invention, the first lateral member is formed with a pair of openings each having a height dimension which gradually decreases in a direction from an adjacent one of the right and left ends toward a laterally intermediate portion of the first lateral member.

According to this feature, the first lateral member has the pair of openings each having a height dimension which gradually decreases in the direction from an adjacent one of the right and left ends toward the laterally intermediate portion of the first lateral member. This makes it possible to remove a portion unnecessary for the diagonal load transmission so as to facilitate reduction in weight of the first lateral member to reduce a weight of the suspension subframe.

Preferably, in the suspension subframe structure of the present invention, the first lateral member has two frame portions, wherein one of the two frame portions extends between the left upper-arm support portion and the right lower-arm support portion to connect them, and the other frame portion extends between the left lower-arm support portion and the right upper-arm support portion to connect them, whereby the first lateral member is formed to extend in a generally X shape in front view.

According to this feature, the first lateral member is formed to extend in a generally X shape in front view. Thus, loads applied to the respective arms are efficiently applied to the respective frame portions. This makes it possible to facilitate the diagonal load transmission so as to effectively cancel out the loads, as described above, Preferably, in the suspension subframe structure of the present invention, each of the right and left ends of the first lateral member is formed such that each of the right and left upper-arm support portions is connected to a corresponding one of the right and left lower-arm support portions in an upward-downward direction.

According to this feature, each of the right and left ends of the first lateral member is formed such that each of the right and left upper-arm support portions is connected to a corresponding one of the right and left lower-arm support portions in an upward-downward direction. This makes it possible to improve both rigidity of the first lateral member and rigidity of each of the lower-arm and upper-arm support portions.

Preferably, the suspension subframe structure of the present invention, each of the right and left upper-arm support portions and a corresponding one of the right and left lower-arm support portions provided in the first lateral member are located above and below a corresponding one of the longitudinal members so as to interpose the longitudinal member therebetween at a given small distance from the longitudinal member.

According to this feature, each of the right and left upper-arm support portions and a corresponding one of the right and left lower-arm support portions are located above and below a corresponding one of the longitudinal members so as to interpose the longitudinal member therebetween. This makes it possible to facilitate effective utilization of space above and below the longitudinal members so as to reduce an overhang of each of the lower-arm and upper-arm support portions from a corresponding one of the longitudinal members to increase rigidity of each of the lower-arm and upper-arm support portions.

Preferably, in the suspension subframe structure of the present invention, the suspension arms of the multi-link suspension system comprise a pair of right and left front upper arms and a pair of right and left front lower arms each disposed on a frontward side of the suspension subframe structure, and the first lateral member is disposed frontward of the second lateral member, so that the first lateral member serves as a front lateral member, and the second lateral member serves as a rear lateral member, wherein the right and left upper-arm support portions and the right and left lower-arm support portions are formed in the front lateral member, in such a manner that the right and left upper-arm support portions support the right and left front upper arms, respectively, and the right and left lower-arm support portions supports the right and left front lower arms, respectively.

According to this feature, the multi-link suspension system have the pair of right and left front upper arms supported by the right and left upper-arm support portions, and the pair of right and left front lower arms supported by the right and left lower-arm support portions, wherein the first lateral member for diagonally transmitting a load therethrough is a front lateral member, and the support portions for the front lower and upper arms are formed in the front lateral member. This makes it possible to allow a large load input into each of the front lower and upper arms during turning of the vehicle to be effectively received by the front lateral member.

Preferably, in the suspension subframe structure of the present invention, the suspension arms of the right and left multi-link suspension system comprise, at least 3 kinds of arms, (i) a pair of right and left longitudinal arms each arranged to extend from a corresponding one of right and left wheel support members in a frontward direction of the vehicle body, (ii) a pair of right and left front upper arms and (iii) a pair of right and left front lower arms each arranged to extend from a corresponding one of the right and left wheel support members in the lateral direction and disposed on a frontward side of the suspension subframe structure, wherein the right and left upper-arm support portions support the right and left front upper arms, respectively, and the right and left lower-arm support portions supports the right and left front lower arms, respectively.

According to this feature, the right and left multi-link suspension system comprises at least 3 kinds of arms, namely (i) the pair of right and left longitudinal arms each arranged to extend from a corresponding one of right and left wheel support members in the frontward direction, (ii) the pair of right and left front upper arms and (iii) the pair of right and left front lower arms each arranged to extend from a corresponding one of the right and left wheel support members in the lateral direction and disposed on a frontward side of the suspension subframe structure, wherein the right and left upper-arm support portions support the right and left front upper arms, respectively, and the right and left lower-arm support portions supports the right and left front lower arms, respectively. This makes it possible to allow a large load input into each of the front lower and upper arms during turning of the vehicle to be effectively received by the front lateral member.

This application is based on Japanese Patent Application Serial No. 2008-081192, filed in Japan Patent Office on Mar. 26, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A suspension subframe structure of a vehicle for supporting a plurality of suspension arms of a multi-link suspension system, comprising:
    first and second lateral members provided in spaced-apart relation to each other in a longitudinal direction of a vehicle body and each extending in a lateral direction of the vehicle body;
    a pair of longitudinal members extending in the longitudinal direction in such a manner that one of the longitudinal member connects respective left ends of the first and second lateral members, and the other longitudinal member connects respective right ends of the first and second lateral members;
    a pair of right and left upper-arm support portions provided in respective ones of the right and left ends of the first lateral member; and
    a pair of right and left lower-arm support portions provided in respective ones of the right and left ends of the first lateral member,
    wherein the first lateral member is formed with a pair of openings each having a height dimension which gradually decreases in a direction from an adjacent one of the right and left ends toward a laterally intermediate portion of the first lateral member, and the first lateral member is formed to allow a load to be transmitted diagonally between the left upper-arm support portion and the right lower-arm support portion and diagonally between the left lower-arm support portion and the right upper-arm support portion.

2. The suspension subframe structure according to claim 1, wherein the right and left upper-arm support portions and the right and left lower-arm support portions are integrally formed in the first lateral member.

3. The suspension subframe structure according to claim 1, wherein at least one of upper and lower portions of the first lateral member is formed as a downwardly-concaved or upwardly-concaved portion in such a manner that a laterally intermediate portion of the first lateral member has a height dimension less than that of each of the right and left ends thereof.

4. The suspension subframe structure according to claim 1, wherein each of the right and left ends of the first lateral member is formed such that each of the right and left upper-arm support portions is connected to a corresponding one of the right and left lower-arm support portions in an upward-downward direction.

5. A suspension subframe structure of a vehicle for supporting a plurality of suspension arms of a multi-link suspension system, comprising:
    first and second lateral members provided in spaced-apart relation to each other in a longitudinal direction of a vehicle body and each extending in a lateral direction of the vehicle body;
    a pair of longitudinal members extending in the longitudinal direction in such a manner that one of the longitudinal member connects respective left ends of the first and second lateral members, and the other longitudinal member connects respective right ends of the first and second lateral members;
    a pair of right and left upper-arm support portions provided in respective ones of the right and left ends of the first lateral member; and
    a pair of right and left lower-arm support portions provided in respective ones of the right and left ends of the first lateral member,
    wherein the first lateral member is formed to allow a load to be transmitted diagonally between the left upper-arm support portion and the right lower-arm support portion and diagonally between the left lower-arm support portion and the right upper-arm support portion; and
    wherein the first lateral member has two frame portions, wherein one of the two frame portions extends between the left upper-arm support portion and the right lower-arm support portion to connect them, and the other frame portion extends between the left lower-arm support portion and the right upper-arm support portion to connect them, whereby the first lateral member is formed to extend in a generally X shape in front view.

6. The suspension subframe structure according to claim 5, wherein the right and left upper-arm support portions and the right and left lower-arm support portions are integrally formed in the first lateral member.

7. The suspension subframe structure according to claim 5, wherein at least one of upper and lower portions of the first lateral member is formed as a downwardly-concaved or upwardly-concaved portion in such a manner that a laterally intermediate portion of the first lateral member has a height dimension less than that of each of the right and left ends thereof.

8. The suspension subframe structure according to claim 5, wherein each of the right and left ends of the first lateral member is formed such that each of the right and left upper-arm support portions is connected to a corresponding one of the right and left lower-arm support portions in an upward-downward direction.

9. A suspension subframe structure of a vehicle for supporting a plurality of suspension arms of a multi-link suspension system, comprising:
- first and second lateral members provided in spaced-apart relation to each other in a longitudinal direction of a vehicle body and each extending in a lateral direction of the vehicle body;
- a pair of longitudinal members extending in the longitudinal direction in such a manner that one of the longitudinal member connects respective left ends of the first and second lateral members, and the other longitudinal member connects respective right ends of the first and second lateral members;
- a pair of right and left upper-arm support portions provided in respective ones of the right and left ends of the first lateral member; and
- a pair of right and left lower-arm support portions provided in respective ones of the right and left ends of the first lateral member,
- wherein the first lateral member is formed to allow a load to be transmitted diagonally between the left upper-arm support portion and the right lower-arm support portion and diagonally between the left lower-arm support portion and the right upper-arm support portion; and
- wherein each of the right and left upper-arm support portions and a corresponding one of the right and left lower-arm support portions provided in the first lateral member are located above and below a corresponding one of the longitudinal members so as to interpose the longitudinal member therebetween at a given small distance from the longitudinal member.

10. The suspension subframe structure according to claim 9, wherein the right and left upper-arm support portions and the right and left lower-arm support portions are integrally formed in the first lateral member.

11. The suspension subframe structure according to claim 9, wherein at least one of upper and lower portions of the first lateral member is formed as a downwardly-concaved or upwardly-concaved portion in such a manner that a laterally intermediate portion of the first lateral member has a height dimension less than that of each of the right and left ends thereof.

12. The suspension subframe structure according to claim 9, wherein each of the right and left ends of the first lateral member is formed such that each of the right and left upper-arm support portions is connected to a corresponding one of the right and left lower-arm support portions in an upward-downward direction.

13. A suspension subframe structure of a vehicle for supporting a plurality of suspension arms of a multi-link suspension system, comprising:
- first and second lateral members provided in spaced-apart relation to each other in a longitudinal direction of a vehicle body and each extending in a lateral direction of the vehicle body;
- a pair of longitudinal members extending in the longitudinal direction in such a manner that one of the longitudinal member connects respective left ends of the first and second lateral members, and the other longitudinal member connects respective right ends of the first and second lateral members;
- a pair of right and left upper-arm support portions provided in respective ones of the right and left ends of the first lateral member; and
- a pair of right and left lower-arm support portions provided in respective ones of the right and left ends of the first lateral member,
- wherein the first lateral member is formed to allow a load to be transmitted diagonally between the left upper-arm support portion and the right lower-arm support portion and diagonally between the left lower-arm support portion and the right upper-arm support portion; and
- wherein the suspension arms of the multi-link suspension system comprise a pair of right and left front upper arms and a pair of right and left front lower arms each disposed on a frontward side of the suspension subframe structure, and the first lateral member is disposed frontward of the second lateral member, so that the first lateral member serves as a front lateral member and the second lateral member serves as a rear lateral member, wherein:
  the right and left upper-arm support portions and the right and left lower-arm support portions are formed in the front lateral member, in such a manner that the right and left upper-arm support portions support the right and left front upper arms, respectively, and the right and left lower-arm support portions supports the right and left front lower arms, respectively.

14. The suspension subframe structure according to claim 13, wherein the right and left upper-arm support portions and the right and left lower-arm support portions are integrally formed in the first lateral member.

15. The suspension subframe structure according to claim 13, wherein at least one of upper and lower portions of the first lateral member is formed as a downwardly-concaved or upwardly-concaved portion in such a manner that a laterally intermediate portion of the first lateral member has a height dimension less than that of each of the right and left ends thereof.

16. The suspension subframe structure according to claim 13, wherein each of the right and left ends of the first lateral member is formed such that each of the right and left upper-arm support portions is connected to a corresponding one of the right and left lower-arm support portions in an upward-downward direction.

17. A suspension subframe structure of a vehicle for supporting a plurality of suspension arms of a multi-link suspension system, comprising:
- first and second lateral members provided in spaced-apart relation to each other in a longitudinal direction of a vehicle body and each extending in a lateral direction of the vehicle body;
- a pair of longitudinal members extending in the longitudinal direction in such a manner that one of the longitudinal member connects respective left ends of the first and second lateral members, and the other longitudinal member connects respective right ends of the first and second lateral members;
- a pair of right and left upper-arm support portions provided in respective ones of the right and left ends of the first lateral member; and
- a pair of right and left lower-arm support portions provided in respective ones of the right and left ends of the first lateral member,
- wherein the first lateral member is formed to allow a load to be transmitted diagonally between the left upper-arm support portion and the right lower-arm support portion and diagonally between the left lower-arm support portion and the right upper-arm support portion; and wherein the suspension arms of the multi-link suspension system comprise, at least 3 kinds of arms; (i) a pair of right and left longitudinal arms each arranged to extend from a corresponding one of right and left wheel support members in a frontward direction of the vehicle body, (ii) a pair of right and left front upper arms and (iii) a pair of right and left front lower arms each arranged to extend from a corresponding one of the right and left wheel support members in the lateral direction and disposed on a frontward side of the suspension subframe structure, wherein the right and left upper-arm support portions support the right and left front upper arms, respectively, and the right and left lower-arm support portions supports the right and left front lower arms, respectively.

18. The suspension subframe structure according to claim 17, wherein the right and left upper-arm support portions and the right and left lower-arm support portions are integrally formed in the first lateral member.

19. The suspension subframe structure according to claim 17, wherein at least one of upper and lower portions of the first lateral member is formed as a downwardly-concaved or upwardly-concaved portion in such a manner that a laterally intermediate portion of the first lateral member has a height dimension less than that of each of the right and left ends thereof.

20. The suspension subframe structure according to claim 17, wherein each of the right and left ends of the first lateral member is formed such that each of the right and left upper-arm support portions is connected to a corresponding one of the right and left lower-arm support portions in an upward-downward direction.

21. A suspension subframe structure of a vehicle for supporting a plurality of suspension arms of a multi-link suspension system, comprising:
  first and second lateral members provided in spaced-apart relation to each other in a longitudinal direction of a vehicle body and each extending in a lateral direction of the vehicle body;
  a pair of longitudinal members extending in the longitudinal direction in such a manner that one of the longitudinal member connects respective left ends of the first and second lateral members, and the other longitudinal member connects respective right ends of the first and second lateral members;
  a pair of right and left upper-arm support portions provided in respective ones of the right and left ends of the first lateral member; and
  a pair of right and left lower-arm support portions provided in respective ones of the right and left ends of the first lateral member,
wherein:
  the first lateral member is formed to allow a load to be transmitted diagonally between the left upper-arm support portion and the right lower-arm support portion and diagonally between the left lower-arm support portion and the right upper-arm support portion;
  the right and left upper-arm support portions and the right and left lower-arm support portions are integrally formed in the first lateral member; and
  at least one of upper and lower portions of the first lateral member is formed as a downwardly-concaved or upwardly-concaved portion in such a manner that a laterally intermediate portion of the first lateral member has a height dimension less than that of each of the right and left ends thereof.

22. A suspension subframe structure of a vehicle for supporting a plurality of suspension arms of a multi-link suspension system, comprising:
  first and second lateral members provided in spaced-apart relation to each other in a longitudinal direction of a vehicle body and each extending in a lateral direction of the vehicle body;
  a pair of longitudinal members extending in the longitudinal direction in such a manner that one of the longitudinal member connects respective left ends of the first and second lateral members, and the other longitudinal member connects respective right ends of the first and second lateral members;
  a pair of right and left upper-arm support portions provided in respective ones of the right and left ends of the first lateral member; and
  a pair of right and left lower-arm support portions provided in respective ones of the right and left ends of the first lateral member,
wherein:
  the first lateral member is formed to allow a load to be transmitted diagonally between the left upper-arm support portion and the right lower-arm support portion and diagonally between the left lower-arm support portion and the right upper-arm support portion;
  the right and left upper-arm support portions and the right and left lower-arm support portions are integrally formed in the first lateral member; and
  the first lateral member is formed with a pair of openings each having a height dimension which gradually decreases in a direction from an adjacent one of the right and left ends toward a laterally intermediate portion of the first lateral member.

* * * * *